United States Patent [19]
Robba et al.

[15] 3,698,646
[45] Oct. 17, 1972

[54] COMPOSITE CARBON INSERT FOR GAS SHIELDED WELDING TORCH NOZZLE

[72] Inventors: William A. Robba, Shoreham, N.Y.; Earl E. Conabee, Easton, Pa.

[73] Assignee: Pfizer Inc., New York, N.Y.

[22] Filed: Jan. 8, 1971

[21] Appl. No.: 105,039

[52] U.S. Cl. ................................................239/591
[51] Int. Cl. ...............................................B05b 1/00
[58] Field of Search ......239/591, 265.11; 117/46 CG

[56] References Cited

UNITED STATES PATENTS

| 2,343,958 | 3/1944 | Crowe | 239/591 X |
|---|---|---|---|
| 3,228,373 | 1/1966 | Podolsky | 117/46 CG X |
| 3,462,522 | 8/1969 | Clark et al. | 117/46 CG X |
| 3,164,487 | 1/1965 | Carley-Macauly et al. | 117/46 CG X |
| 3,156,091 | 11/1964 | Kraus | 239/265.11 |
| 3,157,026 | 11/1964 | Lampert | 239/265.11 X |
| 3,265,314 | 8/1966 | Helms et al. | 239/591 |
| 3,513,014 | 5/1970 | Inoue | 117/46 CG |

Primary Examiner—M. Henson Wood, Jr.
Assistant Examiner—Edwin D. Grant
Attorney—Connolly and Hutz

[57] ABSTRACT

A carbon composite insert is mounted within the removable gas-conducting nozzle of a gas-shielded welding torch to prolong nozzle life and to render the inner surface thereof less adherent to weld splatter, thereby facilitating cleaning. The insert consists of a tubular base having a coating of pyrolytic carbon. The resulting composite insert exhibits enhanced physical strength and spalling resistance.

8 Claims, 4 Drawing Figures

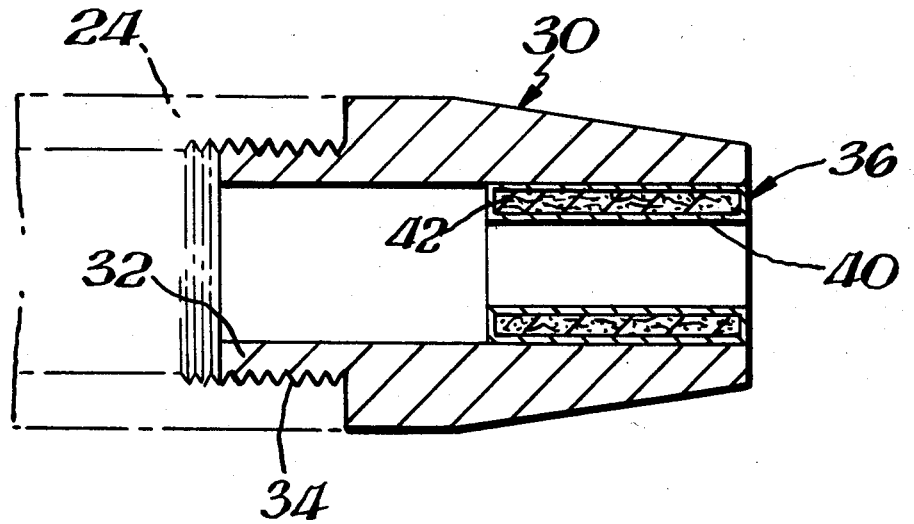

COMPOSITE CARBON INSERT FOR GAS SHIELDED WELDING TORCH NOZZLE

BACKGROUND OF THE INVENTION

This invention relates to the removable nozzle for the nose of a gas-shielded arc welding torch. A gas such as $CO_2$, helium, argon, or a mixture thereof, is passed through and out the nozzle of the torch to shield the weld from contamination by impurities from the surrounding atmosphere. The inner wall of the nozzle is splattered with welding material, which in a relatively short period of time (e.g., about 4 minutes of use) must be cleaned. This weld splatter problem and the extremely high temperatures attained during welding (about 6,000°–12,000°F) limit the useful life of a typical nozzle used today in commercial welding torches. The life of a nozzle varies with operating conditions; under severe conditions the nozzle requires replacement in 2 to 4 hours. This invention provides a surface of pyrolytic carbon within the tip of the nozzle which makes it considerably less adherent to weld splatter. Further, it provides a nozzle having a much longer useful life. As a result of the reduced adherency of weld splatter, much less effort and time are required to clean the pyrolytic carbon surface.

SUMMARY OF THE INVENTION

The removable nozzle for a gas-shielded welding torch is internally surfaced with a composite insert containing pyrolytic carbon, enhancing nozzle life and rendering the inner nozzle surface less adherent to weld splatter, facilitating cleaning. The surfacing is accomplished by mounting a composite tubular insert coated with pyrolytic carbon within the exit end of the nozzle. The pyrolytic carbon may be slightly anisotropic or highly anisotropic in the pyrolytic graphite form. The coating is disposed upon a suitable tubular base, such as polycrystalline graphite or preferably carbonized felt. The felt is coated by impregnation with pyrolytic carbon and may have an additional pyrolytic graphite outer coating. This pyrolytic graphite coated composite insert containing carbonized felt is especially preferred because of its outstanding durability under the severe conditions of use.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

FIG. 1 is a schematic diagram of a gas-shielded welding torch with associated apparatus and work, said torch having a removable nozzle in which an embodiment of this invention is employed;

FIG. 2 is a longitudinal cross-sectional view of the front portion of the torch shown in FIG. 1;

FIG. 3 is a longitudinal cross-sectional view of the front portion of another gas-shielded welding torch incorporating a nozzle employing another embodiment of this invention; and FIG. 4 is a cross-sectional view taken through FIG. 3 along the line 4—4.

DESCRIPTION OF THE PREFERRED EMBODIMENTS

As shown in FIGS. 1 and 2, a gas-shielded arc welding torch 10 is being used to form a weld 12 between steel plates 14 and 16. Torch 10 is connected to gas supply 18, which is, for example, a source of a shielding gas such as argon or $CO_2$ and to a source of weld metal or wire supply 20 which is for example a reel of steel welding wire. A power supply 22 which may be of the AC or DC type is connected between torch 10 and work pieces 14 and 16. Torch 10 has a nose or heat sink 24 within which is longitudinally disposed the metal electrode 26 which is a consumable wire fed from wire supply 20. A shielding gas designated by arrows 28 flows through nose 24 about the consumable metal electrode 26 to shield it from the atmosphere.

Nose 24 incorporates a removable nozzle 30, which is shown in detail in FIG. 2. Nozzle 30 is removably mounted within nose 24 by threaded boss 32 screwed within internally threaded end 34 of nose 24. Nozzle 30 is removable to facilitate replacement. A number of nozzles 30 are provided to permit them to be replaced.

The system described in FIG. 1 includes carbon-dioxide gas-shielded torches as well as the MIG type of welding system, which stands for 'metal inert gas.' This invention is also applicable to the other types of gas-shielded welding system such as TIG (tungsten inert gas), submerged arc welding devices, etc.

The outer end of nozzle 30, shown in FIG. 2 is internally surfaced with pyrolytic carbon by tubular insert 36. Insert 36 is mounted within the end of nozzle 30 by press or interference fit. This interference fit is for example conveniently accomplished by press and shrink fitting. Nozzle 30, which is for example made of copper, is heated to about 600°C. and insert 36 is pressed within it. When nozzle 30 cools, a strong interference fit is achieved. Any other dependable means of attachment such as clamping, swaging, staking, brazing or high temperature cementing may be utilized. Entire nozzle 30 may be made of the same composite material as insert 36 but strong and economical nozzles are made in the inserted form here described.

Tubular insert 36 is for example made in accordance with the following examples.

EXAMPLE I

Pyrolytic Graphite Coating on a Graphite Substrate

A polycrystalline graphite is machined from rod stock into a right cylinder. This cylinder is coated in a high temperature vacuum furnace using flowing methane gas at 2,100°C. and a pressure of 5 mm to produce a pyrolytic graphite coating about 0.005 inch thick.

EXAMPLE II

Pyrolytic Carbon Impregnated Felt

A carbonized rayon needled felt is impregnated with pyrolytic carbon by placing sheets of the carbonized felt material into a vacuum furnace and processing at 1,100°C. with a pressure of 5 mm of flowing methane for a period of about 20 hours. The sheets are then machined into the right cylinder insert configuration and further processed in the vacuum furnace for an additional 60 hours under the above conditions to obtain a specific gravity of 1.4 gm/cc. These inserts are then swaged into copper nozzles.

Alternatively, the carbonized felt may be initially fabricated in tubular form and then impregnated with pyrolytic carbon. Any type of carbon cloth or felt is satisfactory.

EXAMPLE III

Coated Pyrolytic Carbon Impregnated Felt

The inserts are processed as in Example II, and are then coated with pyrolytic graphite as described in Example I before swaging into the copper nozzles. The coating is only 0.0005 inch thick.

Referring to FIG. 2, insert 36 is formed in accordance with Example I and thus incorporates an outer coating of pyrolytic graphite 40 on a base cylinder 42 of polycrystalline graphite.

In FIGS. 3 and 4 is shown an insert 36A made in accordance with Example III having an outer coating 44A of pyrolytic graphite disposed on a tubular base 45A impregnated with pyrolytic carbon as described in Example III. Nozzle 30A is mounted within nose 24A by a collet chuck 46A which retains nozzle 30A by compressing an elastomer O-ring 50A made of a high temperature resistant elastomeric material.

The terms pyrolytic graphite and pyrolytic carbon are widely used and understood. Pyrolytic carbon consists of carbon formed by chemical vapor deposition at temperatures above about 700°C., and pyrolytic graphite is that highly oriented form of pyrolytic carbon which is formed by chemical vapor deposition at temperatures in excess of about 2,000°C. Typical pyrolytic processes for preparing these anisotropic materials are included in Examples I, II and III. Pyrolytic graphite and processes to obtain it are further described in U.S. Pat. No. 3,375,308. See particularly the portions beginning Col. 2, line 59 and Col. 3, line 36. Another patent describing the pyrolytic graphite utilized in this invention is U.S. Pat. No. 3,410,746.

A typical insert for this invention has the following dimensions: outside diameter five-eighths inch, inside diameter one-half inch and length of three-fourths inch. A useful pyrolytic coating for this invention may range in thickness from about 0.0005 inch to 0.01 inch and is for example 0.005 inch thick.

OPERATION

TEST A

Three types of inserts, made in accordance with Examples I, II, and III, are incorporated in torch nozzles and are tested in gas welding torches under identical running conditions using three thirty-seconds inch cored wire and performing the same commercial steel welding operations. A conventional copper nozzle is run in an identical manner for control purposes. The test is made for a 20-hour duration. The control tip requires 206 minutes of cleaning time due to build-up of the weld splatter. The Example I type requires 34 minutes. The Example II type requires 28 minutes and the Example III type requires 22 minutes total cleaning time.

TEST B

Four of the Example III type composite nozzles are run in three different welding shops. Three are run for 60 hours with only minimal erosion before testing is terminated. The fourth nozzle is run for 870 hours before testing is terminated. All four nozzles remain in excellent condition and require less frequent and easier cleaning than the control sleeve.

TEST C

A composite nozzle constructed according to Example III is run for 479 hours without apparent degradation using MIG torch conditions of 170 to 360 amps, a gas composed of 70% $CO_2$—30% argon and a 3/16 - inch low carbon stainless steel wire.

What is claimed is:

1. A gas-shielded welding torch nozzle having an electrode longitudinally disposed within it comprising a tubular base, and a coating of anisotropic pyrolytic carbon on said base, whereby said nozzle is resistant to the heat of welding and to weld splatter and whereby removal of said weld splatter from said nozzle is facilitated.

2. An nozzle as set forth in claim 1 wherein said base consists essentially of polycrystalline graphite.

3. An nozzle as set forth in claim 2 wherein said coating has a thickness of from about 0.0005 to 0.01 inch.

4. An nozzle as set forth in claim 1 wherein said base consists essentially of carbonized felt and said coating is impregnated on said felt.

5. An nozzle as set forth in claim 4 having an additional coating of anisotropic pyrolytic graphite on the surface thereof.

6. An nozzle as set forth in claim 5 wherein said anisotropic pyrolytic graphite coating has a thickness of from about 0.0005 to 0.01 inch.

7. A composite nozzle for a gas-shielded welding torch comprising the nozzle set forth in claim 1, and a supporting tube of heat resistant material, said nozzle being mounted within said supporting tube.

8. A composite nozzle as set forth in claim 7 wherein said supporting tube has a counterbore within the exit end and said nozzle is mounted within said counterbore.

* * * * *